United States Patent [19]

Yang

[11] Patent Number: 5,776,216

[45] Date of Patent: Jul. 7, 1998

[54] VACUUM PUMP FILTER FOR USE IN A SEMICONDUCTOR SYSTEM

[75] Inventor: Vince W. H. Yang, Hsinchu, Taiwan

[73] Assignee: Vanguard International Semiconductor Corporation, Hsinchu, Taiwan

[21] Appl. No.: 783,477

[22] Filed: Jan. 14, 1997

[51] Int. Cl.$^6$ ................................................. B01D 46/00

[52] U.S. Cl. ................ 55/385.1; 55/485; 55/487; 55/503; 55/DIG. 6

[58] Field of Search ........................ 55/385.1, 385.2, 55/485, 482, 503, 467, 473, 486, 487, DIG. 6

[56] References Cited

U.S. PATENT DOCUMENTS

| | | | |
|---|---|---|---|
| 2,400,719 | 5/1946 | Stackhouse | 55/503 |
| 2,952,331 | 9/1960 | Beach | 55/485 |
| 3,386,580 | 6/1968 | Grabarczyk | 55/485 |
| 3,422,679 | 1/1969 | McGowan et al. | 55/385.1 |
| 3,557,536 | 1/1971 | Ririe | 55/485 |
| 3,898,063 | 8/1975 | Gazan | 55/503 |
| 5,375,293 | 12/1994 | Gilbertson | 55/482 |
| 5,536,286 | 7/1996 | Freeman | 55/385.1 |

FOREIGN PATENT DOCUMENTS 2399267   3/1979   France .................. 55/485

*Primary Examiner*—Duane S. Smith
*Attorney, Agent, or Firm*—Christensen O'Connor, Johnson & Kindness PLLC

[57] ABSTRACT

A vacuum pump filter for filtering debris from a semiconductor system is disclosed. The vacuum pump filter includes an inlet port for connecting to a chamber. A first filter holder is connected to the inlet port for filtering large debris. A second filter holder for filtering middle debris is connected to the first filter holder. A third filter holder is connected to the second filter holder for filtering small debris. A outlet port is connected to the third filter holder via a terminal. The other terminal of the outlet port is connected to a pump system.

18 Claims, 2 Drawing Sheets

VACUUM PUMP FILTER FOR USE IN A SEMICONDUCTOR SYSTEM

TECHNICAL FIELD OF THE INVENTION

The present invention relates to a semiconductor system, and more particularly, to an improved vacuum pump filter for used in a semiconductor pump system.

BACKGROUND OF THE INVENTION

The semiconductor technology that ultimately led to the integrated circuit (IC) was many years in the making. Semiconductor devices and circuit designs have become much more attuned to space-saving features. For example, some of the early DRAM memory cells required six transistors, whereas now one transistor and one capacitor suffice. Also, much more attention is given to designs that are more tolerant of semiconductor process variation.

The semiconductor pump system plays an important role in the semiconductor manufacturing process. Common processes such as oxidation, diffusion, chemical vapor deposition, and annealing are performed in a furnace or other chamber. Most chambers that are used have a pump system to exhaust the process gas in the chamber. In addition, another pump system is also used for cleaning the chamber, cleaning the clean rooms and so on. This pump system is used to remove screws and other debris such as wafer debris that can be left in the chamber.

Turning to FIG. 1, a typical semiconductor fabrication factory 1 used for semiconductor process is shown in schematic. A plurality of chambers (or clean rooms) 3 are set in the factory 1. A pump system 5 used for cleaning the chambers 3 or reducing the particle number in a space is connected to a pipe 9. The pipe 9 is typically set under the ground and has many ports 11 that is set on the floor of the fabrication 1. Each port 11 has a cap attached on it. When the chambers 3 needs to be cleaned or the particulates in the clean room needs to be reduced, the caps atop ports 11 are opened and the chambers 3 and the clean room is then connected to the pump 5 via ports 11 and via pipe 9. However, in the prior art, there is no mechanism for preventing screws and other debris from being sucked down into the pump 5.

SUMMARY OF THE INVENTION

A filter for use in a semiconductor fabrication system is disclosed. The filter comprises an inlet port used to connect to a port of a semiconductor system, said inlet port comprising: (i) a first cylinder having a first terminal and a second terminal, said first cylinder connected to said port of said semiconductor system via said first terminal; and (ii) a second cylinder having first internal spiral threads, said second cylinder coaxially connected to said first cylinder via said second terminal of said first cylinder; a first filter holder having a first filter, said first filter holder having first external spiral threads for connecting to said first internal spiral threads of said second cylinder and second internal spiral threads; a second filter holder having a second filter, said second filter holder having second external spiral threads for connecting to said second internal spiral threads of said first filter holder and a third internal spiral threads; a third filter holder having a third filter, said third filter holder having third external spiral threads for connecting to said third internal spiral threads of said second filter holder and forth internal spiral threads; and an outlet port used to connect to a pump system, said outlet port including fourth external spiral threads for connecting to said fourth internal spiral threads of said third filter holder.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
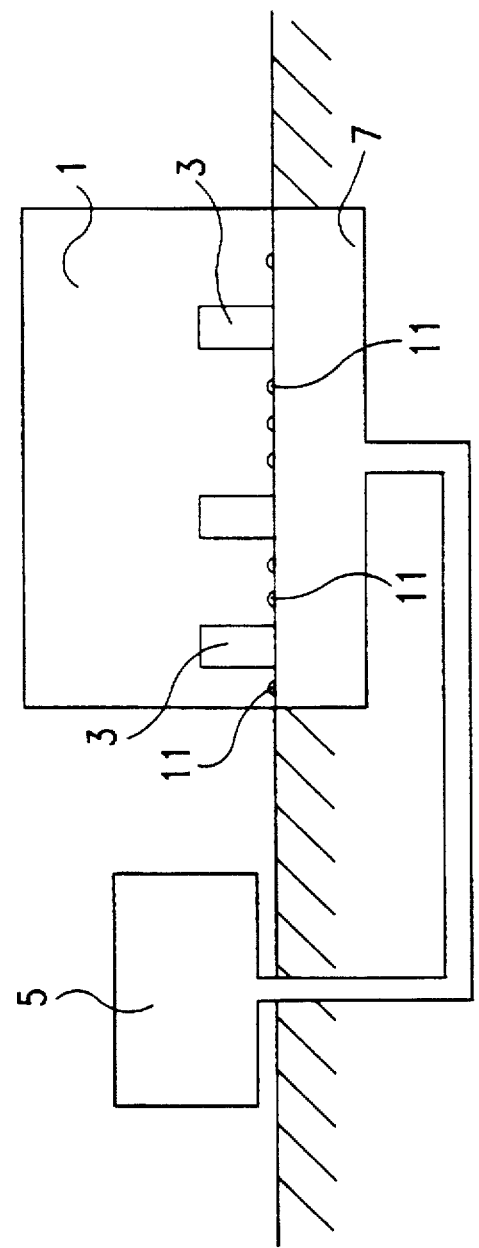
FIG. 1 is a schematic diagram of a prior art semiconductor fabrication system.
Figure 2:
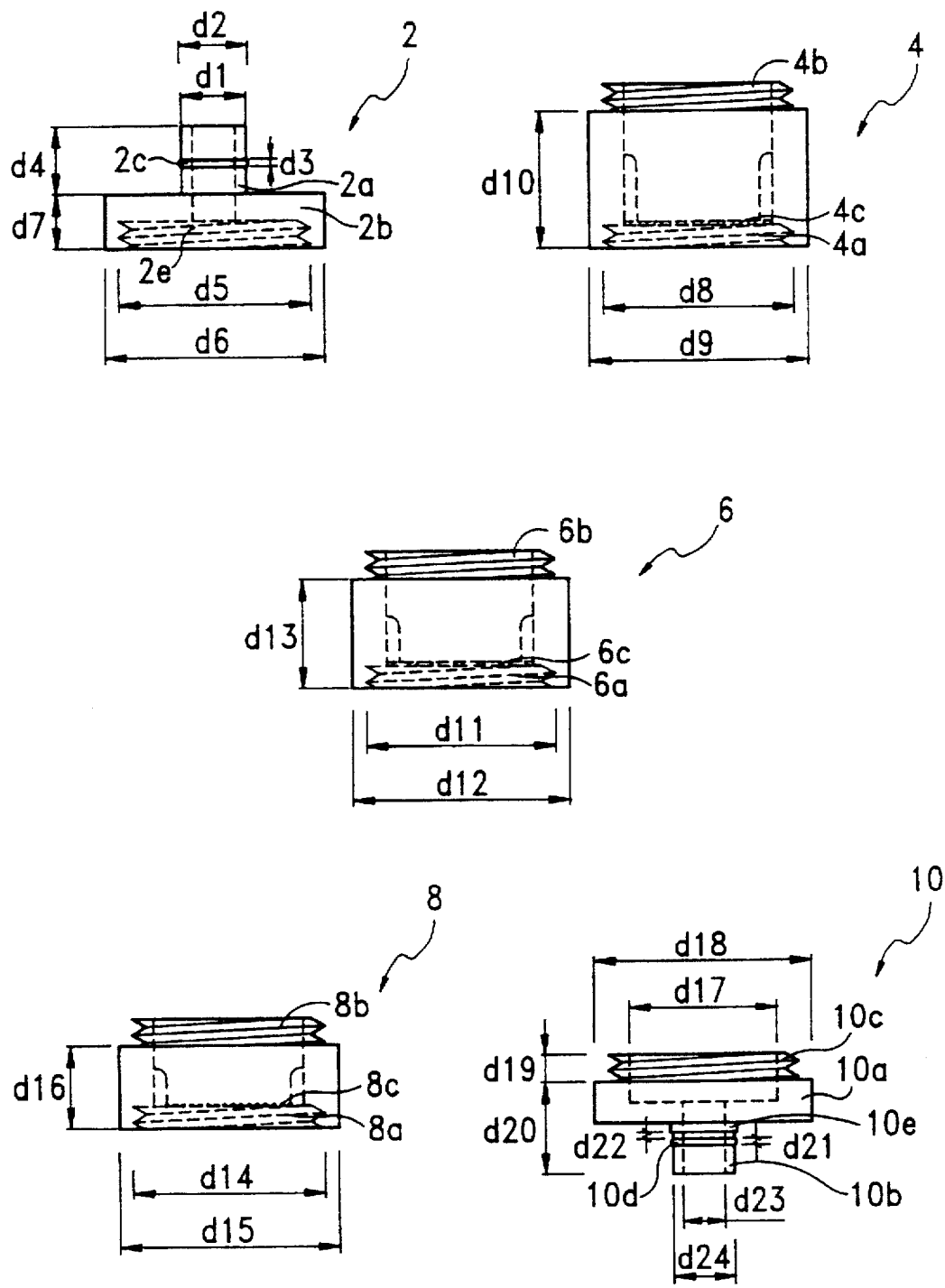
FIG. 2 is a filter for use in the semiconductor fabrication system of FIG. 1 in accordance with the present invention.

Turning to FIG. 2, a filter 100 for use in a semiconductor pump system includes an inlet port 2, a first filter holder 4, a second filter holder 6, a third filter holder 8 and an outlet port 10. The filter 100 is typically set between the pump station 5 and the semiconductor fabrication system 1. The filter 100 and its components are preferably made of metal, alloy or stainless steel.

The inlet port 2 includes a first cylinder 2a and a second cylinder 2b. The internal diameter d1 of the first cylinder 2a is preferably 42 mm, while the external diameter d2 of the first cylinder 2a is preferably 47 mm. One terminal of the first cylinder 2a is used to connect to the chamber 7 via pipe 9. A first ring portion 2c is attached on the first cylinder 2a. The height d3 of the ring portion 2c is about 6 mm. The ring portion 2c is used for engaging the inlet port 2 to the chamber 7. The height d4 of the first cylinder 2a is preferably 50 mm.

The second cylinder 2b is coaxially connected to the other terminal of the first cylinder 2a. The second cylinder 2b has first internal spiral threads 2e used to connect to the first filter holder 4. Preferably, the internal diameter d5 of the second cylinder 2b is 140 mm, while the external diameter d6 of the second cylinder 2b is 160 mm. The height d7 the second cylinder 2b is 40 mm.

The first filter holder 4 has a second internal spiral threads 4a used for engaging with the second filter holder 6 and a first external spiral thread 4b used for engaging the first internal spiral threads 2e of inlet port 2. In the preferred embodiment, the internal diameter d8 and the external diameter d9 of the first filter holder are respectively 140 mm, 160 mm, while the height d10 of the first filter holder 4 is 100 mm. A first filter 4c is set in the first filter holder 4 for filtering large sized debris. Preferably, the first filter 4c is a metal mesh net of 900 mm$^2$ holes (30 mm×30 mm).

The second filter holder 6 has a third internal spiral thread 6a used to engage the third filter holder 8. A second external spiral thread 6b is used to engage the internal spiral threads 4a of first filter holder 4. Preferably, the internal diameter d11 of the second filter holder is about 140 mm and the external diameter d12 of the second filter holder 6 is about 160 mm. The height d13 of the second filter holder 6 is 80 mm. In the present embodiment, a second filter 6c is set in the second filter holder 4 with a metal mesh net of 64 mm$^2$ holes (8 mm×8 mm) for filtering middle sized debris.

The third filter holder 8 has fourth internal spiral threads 8a that are used to engage the outlet portion 10. Third external spiral threads 8b are used to engage the third internal spiral thread 6a of second filter holder 6. In the preferred embodiment, the internal diameter d14 and the external diameter d15 of the third filter holder 8 are 140 mm and 160 mm, respectively. The height d16 of the third filter holder 8 is about 60 mm. Further, a third filter 8c having a metal mesh net 25 mm 2 holes (5 mm×5 mm) is set in the third filter holder 8 for filtering small sized debris.

The outlet port 10 in the preferred embodiment includes a third cylinder 10a and a fourth cylinder 10b. The internal diameter d17 of the third cylinder 10a is 140 mm and the external diameter d18 of the third cylinder 10a is 160 mm. The third cylinder 10a includes forth external spiral threads 10c that are used to engage the fourth internal spiral threads 8a of the third filter holder 8. The height d19 of the third cylinder 10a is preferably 30 mm. The fourth cylinder 10b is coaxially connected to the third cylinder 10a. Preferably, the height d20 of the fourth cylinder 10b is 38 mm. One terminal of the fourth cylinder 10b is used to engage the pipe 9. A second ring portion 10d is attached on the fourth cylinder 10b to aid in this purpose. The height d21 of the second ring portion 10d is about 8 mm. A third ring portion 10e is attached on the inner portion of the fourth cylinder 10b abutting the third cylinder 10a. The height d22 of the third ring portion 10e is about 7 mm. The internal diameter d23 of the fourth cylinder 10b is 36 mm and the external diameter d24 of the forth cylinder 10b is 45 mm.

While the preferred embodiment of the invention has been illustrated and described, it will be appreciated that various changes can be made therein without departing from the spirit and scope of the invention. For example, the first, second, and third mesh nets may be formed from magnetized materials to aid in the retention of metallic debris.

The embodiments of the invention in which an exclusive property or privilege is claimed are defined as follows:

1. A filter assembly for use in a semiconductor fabrication system, said filter assembly comprising:
   an inlet port used to connect to a port of a semiconductor system, said inlet port comprising:
   (i) a first cylinder having a first terminal and a second terminal, said first cylinder connected to said port of said semiconductor system via said first terminal; and
   (ii) a second cylinder having first internal spiral threads, said second cylinder coaxially connected to said first cylinder via said second terminal of said first cylinder;
   a first filter holder having a first filter, said first filter holder having first external spiral threads for connecting to said first internal spiral threads of said second cylinder and second internal spiral threads;
   a second filter holder having a second filter, said second filter holder having second external spiral threads for connecting to said second internal spiral threads of said first filter holder and a third internal spiral threads;
   a third filter holder having a third filter, said third filter holder having third external spiral threads for connecting to said third internal spiral threads of said second filter holder and fourth internal spiral threads, wherein said first filter, second filter and said third filter are mesh nets having holes, wherein said first filter has the largest holes and said third filter has the smallest holes; and
   an outlet port used to connect to a pump system, said outlet port including fourth external spiral threads for connecting to said fourth internal spiral threads of said third filter holder.

2. The filter assembly of claim 1 further comprising a first ring portion attached on said first cylinder for engaging said inlet port to said semiconductor system.

3. The filter assembly of claim 1, wherein said first, second, and third filters are made from a magnetic material.

4. The filter assembly of claim 1, wherein the internal diameter of said second cylinder is about 140 mm and the external diameter of said second cylinder is about 160 mm.

5. The filter assembly of claim 4, wherein the height of said second cylinder is about 40 mm.

6. The filter assembly of claim 1, wherein the internal diameter of said first filter holder is about 140 mm and the external diameter of said first filter holder is about 160 mm.

7. The filter assembly of claim 6, wherein the height of said first filter holder is about 100 mm.

8. The filter assembly of claim 1, wherein the internal diameter of said second filter holder is about 140 mm and the external diameter of said second filter holder is about 160 mm.

9. The filter assembly of claim 8, wherein the height of said second filter holder is about 80 mm.

10. The filter assembly of claim 1, wherein the internal diameter of said third filter holder is about 140 mm and the external diameter of said third filter holder is about 160 mm.

11. The filter assembly of claim 10, wherein the height of said third filter holder is about 60 mm.

12. The filter assembly of claim 1, wherein said first filters are 900 $mm^2$, said second filters are 64 $mm^2$, and said third filters are 25 $mm^2$.

13. The filter assembly of claim 1, wherein the internal diameter of said first cylinder is about 42 mm and the external diameter of said second cylinder is about 47 mm.

14. The filter assembly of claim 13, wherein the height of said first cylinder is about 50 mm.

15. The filter assembly of claim 1, wherein said first filter holder, said second filter holder and said third filter holder are cylinders.

16. A filter assembly for use in a semiconductor fabrication system, said filter assembly comprising:
   an inlet port used to connect to a port of a semiconductor system, said first inlet port including first internal connection means;
   a first filter holder having a first filter, first external connection means for connecting to said first internal connection means, and second internal connection means;
   a second filter holder having a second filter, second external connection means for connecting to said second internal connection means, and third internal connection means;
   a third filter holder having a third filter, third external connection mean for connecting to said third internal connection means, and fourth internal connection means, wherein said first filter, second filter and said third filter are mesh nets having holes, wherein said first filter has the largest holes and said third filter has the smallest holes; and
   an outlet port used to connect to a pump system, said outlet port including fourth external connection means for connecting to said fourth internal connection means of said third filter holder.

17. The filter assembly of claim 15, wherein said first, second, and third filters are made from a magnetic material.

18. A filter assembly for use in a semiconductor fabrication system, said filter assembly comprising:
   an inlet port used to connect to a port of a semiconductor system, said inlet port comprising:
   (i) a first cylinder having a first terminal and a second terminal, said first cylinder connected to said port of said semiconductor system via said first terminal; and (ii) a second cylinder having a first internal spiral threads, said second cylinder coaxially connected to said first cylinder via said second terminal of said first cylinder;

a first filter holder having a first filter, said first filter holder having first external spiral threads for connecting to said first internal spiral threads of said second cylinder and second internal spiral threads;

a second filter holder having a second filter, said second filter holder having second external spiral threads for connecting to said second internal spiral threads of said first filter holder and a third internal spiral threads;

a third filter holder having a third filter, said third filter holder having third external spiral threads for connecting to said third internal spiral threads of said second filter holder and forth internal spiral threads, wherein said first filter, second filter and said third filter are mesh nets having holes, wherein said first filter has the largest holes and said third filter has the smallest holes, wherein said first, second, and third filters are made from a magnetic material; and an outlet port used to connect to a pump system, said outlet port including fourth external spiral threads for connecting to said fourth internal spiral threads of said third filter holder.

* * * * *